United States Patent
Narciso

(10) Patent No.: US 6,666,759 B2
(45) Date of Patent: Dec. 23, 2003

(54) METHOD AND DEVICE FOR STUFFING MEAT PRODUCT SEALED BY STAPLING

(75) Inventor: Lagares-Corominas Narciso, Girona (ES)

(73) Assignee: Metalquimia, SA, Girona (ES)

( * ) Notice: Subject to any disclaimer, the term of this patent is extended or adjusted under 35 U.S.C. 154(b) by 0 days.

(21) Appl. No.: 10/263,344

(22) Filed: Oct. 3, 2002

(65) Prior Publication Data

US 2003/0073398 A1 Apr. 17, 2003

Related U.S. Application Data

(63) Continuation of application No. 09/763,623, filed as application No. PCT/SE99/00284 on Sep. 3, 1999, now abandoned.

(30) Foreign Application Priority Data

Sep. 4, 1998 (ES) .............................................. 9801878

(51) Int. Cl.[7] .............................................. A22C 11/00
(52) U.S. Cl. .............................. 452/48; 452/29; 452/35
(58) Field of Search ............................ 452/29, 31, 35, 452/37, 43, 45, 46, 47, 48, 49

(56) References Cited

U.S. PATENT DOCUMENTS

| | | | |
|---|---|---|---|
| 3,462,793 A | | 8/1969 | Sumption |
| 3,731,346 A | * | 5/1973 | Kupcikevicius .............. 452/31 |
| 3,748,690 A | * | 7/1973 | Niedecker .................... 452/31 |
| 3,930,309 A | * | 1/1976 | Collins ........................ 30/161 |
| 3,975,795 A | | 8/1976 | Kupcikevicius |
| 4,417,434 A | | 11/1983 | Piereder |
| 4,419,790 A | | 12/1983 | Niedecker |
| 4,565,054 A | * | 1/1986 | Piereder ...................... 53/517 |
| 4,642,848 A | * | 2/1987 | Kollross ...................... 452/22 |
| 4,771,510 A | * | 9/1988 | Kawai .......................... 452/35 |
| 4,773,128 A | * | 9/1988 | Stanley et al. ................ 452/31 |
| 5,456,668 A | * | 10/1995 | Ogle, II ...................... 604/110 |
| 5,466,184 A | * | 11/1995 | May ........................... 452/38 |
| 5,743,792 A | * | 4/1998 | Hanten et al. ................ 452/37 |
| 5,842,914 A | * | 12/1998 | Vermeer et al. .............. 452/47 |
| 6,059,646 A | * | 5/2000 | Bindels et al. ................ 452/29 |

FOREIGN PATENT DOCUMENTS

| | | | | |
|---|---|---|---|---|
| EP | 0247546 A1 | | 12/1987 | |
| EP | 0399195 A1 | | 11/1990 | |
| EP | 0507374 A1 | | 10/1992 | |
| EP | 0570253 | * | 11/1993 | ................... 452/48 |
| EP | 0847695 A1 | | 6/1998 | |
| EP | 0904697 A1 | | 3/1999 | |
| ES | 2154962 | | 4/2001 | |
| JP | 63281971 | * | 11/1988 | ................... 452/48 |

* cited by examiner

*Primary Examiner*—Peter M. Poon
*Assistant Examiner*—David Parsley
(74) *Attorney, Agent, or Firm*—Jacobson Holman PLLC

(57) ABSTRACT

A method and device for stuffing meat materials into sausages closed by stapling. The processed meat materials, before their introduction into an endless sleeve having a first closed extremity and further narrowing of the stuffed material at regular intervals by spaced staples to produce a line of stuffed elements, are previously subjected to a cutting step at regular intervals of the continuous flow of meat material to be stuffed into the sleeve, making the cuts coincide with posterior zones of narrowing. The device for implementing the process includes a stuffing zone with continuous flow of meat materials, from a stuffing machine through an outlet tube introduced into the sleeve, having a first closed extremity, and includes between the outlet tube of the stuffing machine and the stuffing zone, a guillotine assembly intended to cut transversally the meat material.

9 Claims, 2 Drawing Sheets

METHOD AND DEVICE FOR STUFFING MEAT PRODUCT SEALED BY STAPLING

This application is a continuation of U.S. patent application Ser. No. 09/763,623, filed Jun. 4, 2001 now abandoned which is a 371 of PCT/SE99/00284 filed Sep. 3, 1999 and herein incorporated by reference.

FIELD OF THE INVENTION

This invention relates to a method for stuffing meat product sealed by stapling and a related device to carry out the method.

BACKGROUND OF THE INVENTION

The process followed up to now for stuffing meat product consisted, first, in conditioning the meat product to provide it with desired physical, organoleptic and sanitary characteristics. This conditioning generally includes chopping it or breaking it up into pieces until reducing it to lumps having a variable size according to the product it is desired to obtain. Thereafter, by means of a suitable apparatus, a continuous flow of broken up pieces of meat product are introduced into an endless sleeve which has a first end previously sealed by means of a staple, so that a continuous section of stuffed meat product is produced. Then, the continuous section of stuffed meat product is reduced in cross-section at regular intervals by means of first and second slightly spaced staples. With said stapling a continuous strip of stuffed meat product elements is obtained in a sleeve, sealed by stapling, linked to each other by a portion of sleeve existing between said first and said second staples close to each other. Finally, the sleeve is cut at the portion thereof located between said first and second staples, obtaining in that way individual, separate elements of meat product stuffed within a portion of sleeve sealed at both ends with staples.

In the state of the art, equipment and devices to carry out stuffing of meat product according to the above disclosed method are known, and one mentioned in Spanish Patent Application n° 9702538 of the same applicant, in which a machine for stuffing meat product is disclosed which comprises a hopper for receiving already conditioned meat product, within which two pistons are acting to remove and push said meat product to let the meat product pass through a rotating valve, synchronized with the motion of the pistons so that a continuous flow of meat product is produced through a stuffing duct open at one end, in order that the meat product is stuffed at the same time as it moves in an endless sleeve which has been previously arranged and corrugated in said stuffing duct with a first end sealed by means of a staple.

Also machines are known for reducing cross section at regular intervals in a continuous sleeve stuffed with meat product by means of a double staple, i.e., first and second staples close to each other, and cutting the portion of the sleeve which remains located between two adjacent staples to produce individual portions of stuffed meat product sealed with staples. Examples of this type of machine are found in EP-0247546 and EP-0399195.

Usually, a stuffing facility comprises a stapling machine installed close to the outlet of the stuffing machine.

The problem of the method and the devices of the state of the art is that reduction of the continuous section of stuffed meat product by means of two adjacent staples has insufficient strength to cut the fibers of the meat product, namely in the event that the meat product has a particular hardness or is broken into pieces with a relatively large size in a lump, so that the individual pieces of sausages which result after cutting the portion of sleeve between two adjacent staples show portions or lumps of meat not fully cut which are seen at the staples, which could not be fully sealed because of those portions being present. This causes the pieces obtained to be unacceptable for obvious sanitary reasons and cannot be presented to the public. The portions of meat in contact with the external environment can be rotten and contaminate the meat within the sausage. Also when the meat product is finely chopped, a problem arises because portions thereof can be left in the portion of the sleeve between two adjacent staples which will remain exposed to the external environment after cutting said portion of sleeve, which can produce a bad smell.

EP-A-847695 discloses a method (basically also revealed in U.S. Pat. No. 4,417,434) and a corresponding device for stuffing a meat product sealed by stapling.

However the device disclosed in EP-A-847695 includes a knife blade 17 driven in rotation, which implies the use of hydromotor or a pneumaticaly driven motor leading to a troublesome assembly, which is avoided in the device of the present invention.

SUMMARY OF THE INVENTION

This invention provides a new method to stuff meat product sealed by a staple which brings a solution to these problems.

This invention also provides a device to carry out said method.

The new method essentially consists in introducing a new step in the conventional stuffing process which consists in cutting at regular intervals said continuous flow of meat product before introducing it in said endless sleeve, having said intervals of cutting coincident with the further reduced intervals by means of a double staple.

The cut carried out in the meat continuous flow produces adjacent portions of meat product flow which move jointly within the stuffing duct which push each other. The existence of said cut creates a lack of cohesion between a portion of the meat product flow and ist preceding one which causes at the moment of chocking, that both portions are separated from each other, sliding within the sleeve, leaving the portion of sleeve between two adjacent staples clean and clear.

This is achieved, according to this invention, by means of a new trimming device which may be installed interposed between a conventional stuffing machine and a conventional stapling machine.

The new trimming device comprises an enclosure intercalated in the duct of the meat product continuous flow, which provides a passageway for it and a guide for a cross cutting blade which has access to the enclosure through a passageway which remains closed by the cutting blade itself. Said enclosure has available means which comprise it allowing the eventual opening thereof. Also driving means for said cutting blade and suitable supporting means are provided.

Thereafter details of the invention are disclosed which have to be read with reference to the drawings attached, being understood that the drawings are only an example of a possible embodiment of the invention and therefore they must not be purported as restrictive but only illustrative.

DETAILED DESCRIPTION OF THE PREFERRED EMBODIMENTS

Figure 1:
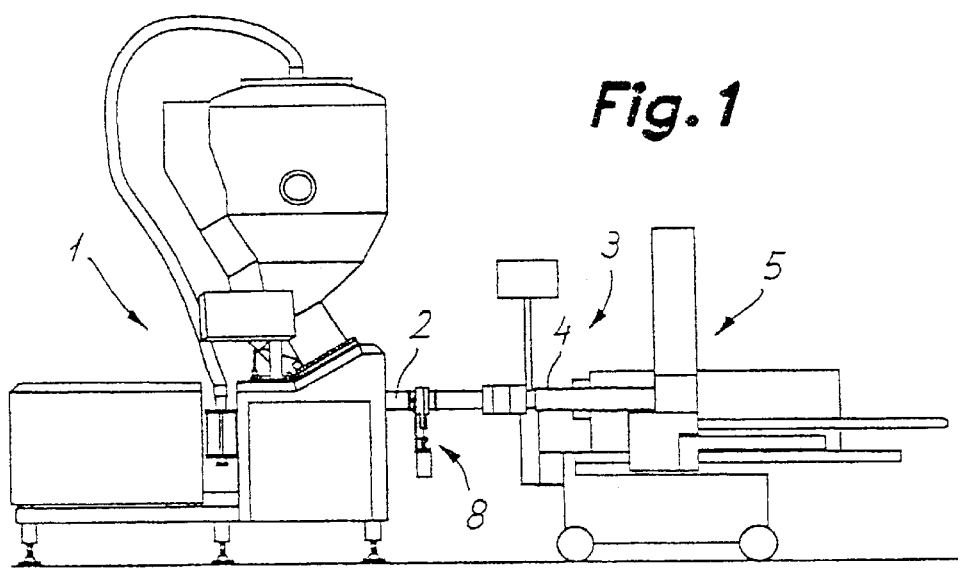
FIG. 1 is a side elevation view of a stuffing device to carry out the method of this invention which includes a trimming device according to this invention.
Figure 2:
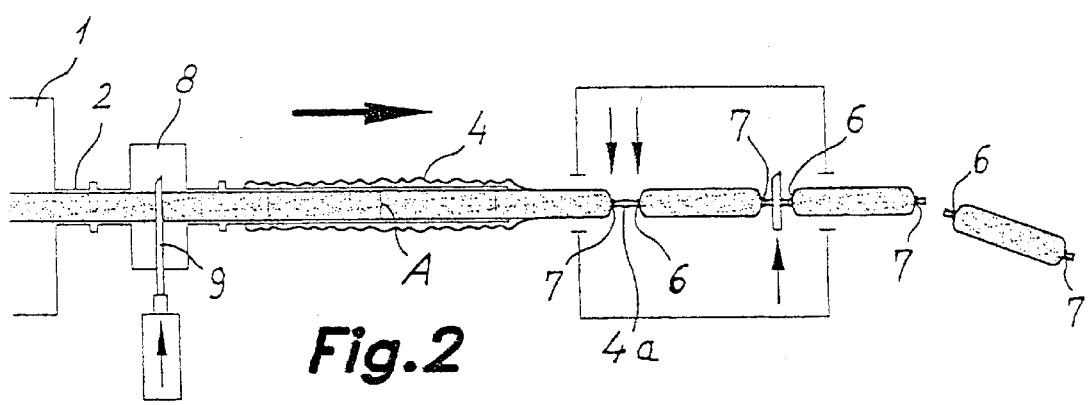
FIG. 2 is a sketch which illustrates the steps of the new method of this invention.
Figure 3:
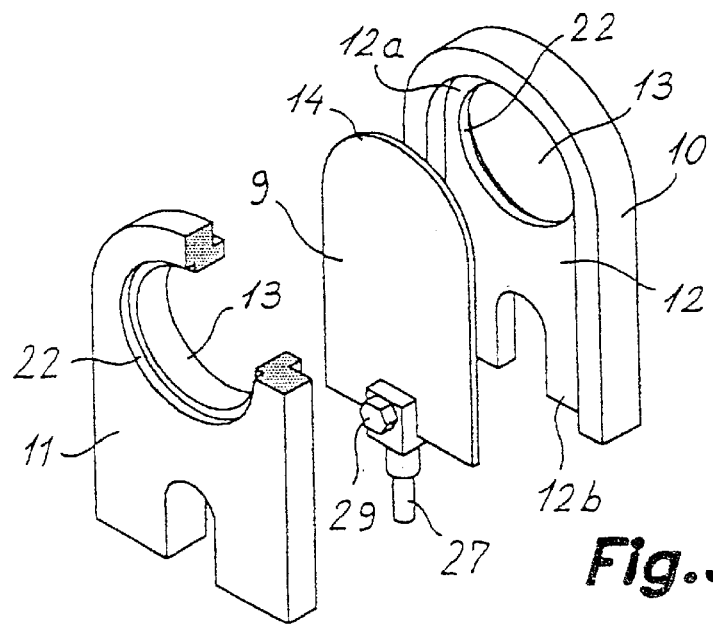
FIG. 3 is an exploded view in perspective which shows an enclosure and a cutting blade of the trimming device of the invention.
Figure 4:
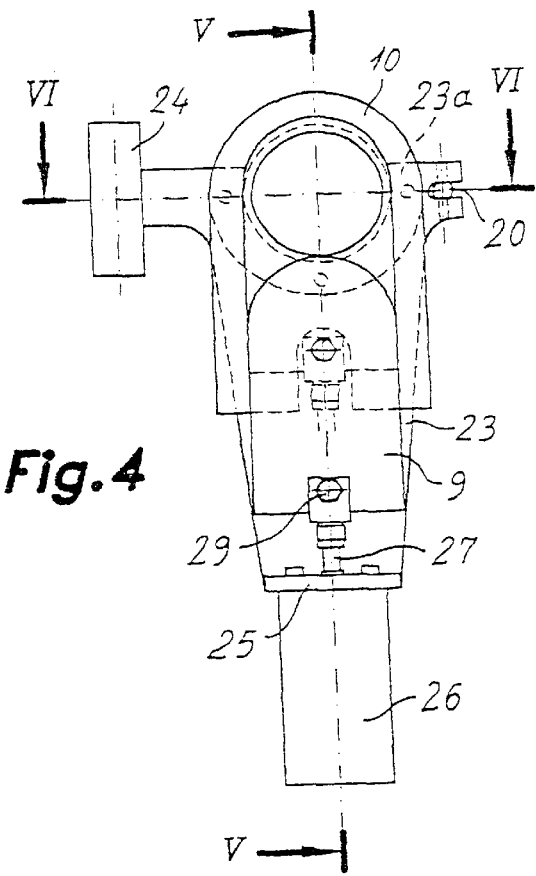
FIG. 4 is a front view of the trimming device of the invention.
Figure 5:
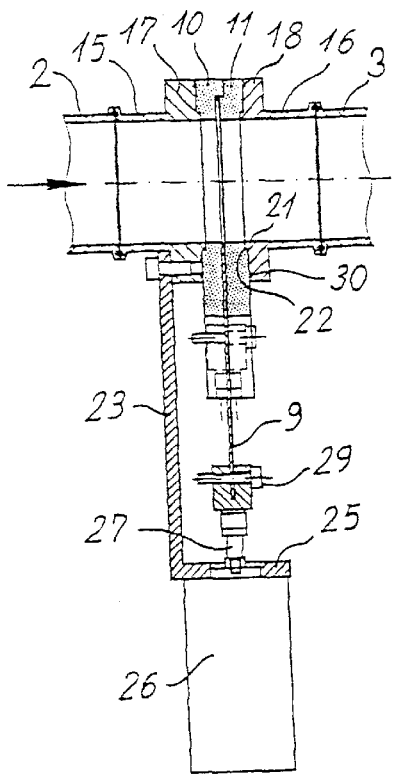
FIGS. 5 and 6 are cross section views taken respectively along the lines V—V and VI—VI of FIG. 4.
Figure 6:
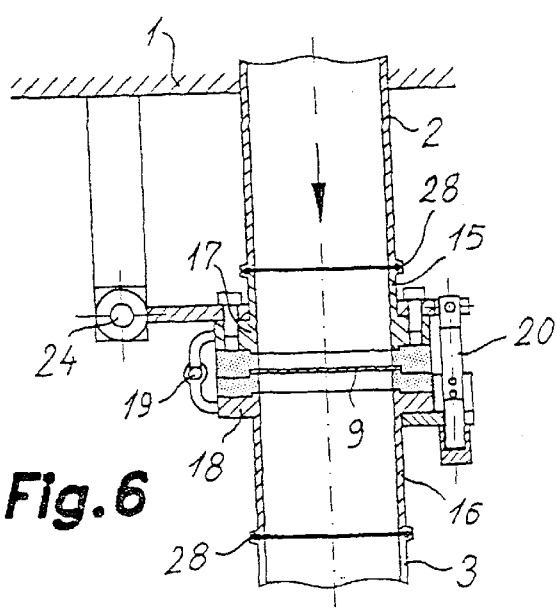

It is first referred to FIGS. 1 and 2, in which is shown a device according to this invention for stuffing meat product sealed by stapling which comprises a stuffing area 3 where a continuous flow of previously conditioned meat product, supplied by a stuffing machine 1 through an outlet 2 is introduced into an endless sleeve 4. Said sleeve 4 has been previously arranged, corrugated on a duct in the stuffing area 3 and has a first end previously sealed by means of a staple. The meat product, when going out through the open end of the duct at the stuffing area 3, fills the continuous sleeve 4 providing a continuous section of stuffed meat product.

After the stuffing area 3 there is a stapling machine 5. Said stapling machine 5 reduces a continuous section of the stuffing, at regular intervals, by means of a double staple, i.e. by means of first and second slightly spaced staples 6, 7. Said stapling machine 5, in addition, cuts thereafter the sleeve 4 in the portion 4a thereof located between said first and said second staples 6, 7 to produce individual elements of stuffed meat product sealed at both ends by staples 6,7.

Between said outlet 2 of the stuffing machine 1 and said stuffing area 3, a trimming device 8 is installed adapted to produce a cross cut which produces separations A, at regular intervals, in said continuous flow of meat product, before the separations are introduced in said endless sleeve 4. The device includes programmable control means (not shown) to have said separation A coincident at regular intervals with the further regular choking intervals by means of said staples 6, 7. At the stapling step, the meat product at both sides of the separation A is withdrawn under the pressure of the double staples 6, 7 leaving the portion of the sleeve 4a between staples 6, 7 clean and clear so that when it is cut, stapled individual elements of sausage are produced with excellent appearance and sanitary properties.

Thereafter, with reference to FIGS. 3 to 6, it is shown that said trimming device 8 comprises an enclosure intercalated in the duct of the meat product continuous flow which provides a passageway for the meat product and a guide for a cross cutting blade 9 which has access to the enclosure through a passageway which remains closed by the cutting blade 9 itself.

Said enclosure is formed by a liner which comprises two halves 10, 11, matched with tongues and grooves, which when coupled to each other leave a flat cavity 12 between them for housing and guiding said cutting blade 9. Each of the two halves 10, 11 incorporates an opening 13 for the passage of said meat product, having a cross section equal in shape and size to the cross section of the meat product flow. When they are assembled, said openings 13 remain directly facing each other and perpendicular to the guiding plane of the cutting blade.

One of the ends 12a of said flat cavity 12 close to said openings 13 remains closed by the matching tongues and grooves of said two halves 10, 11, while the other end 12b remains open for the free passage of the cutting blade 9. During the operation, said end 12b remains closed by the cutting blade 9 itself by virtue of small clearances.

The travel of the cutting blade 9 is carried out between a first position in which said openings 13 remains clear and a second position in which the cutting blade 9 remains fully interposed between said openings 13.

In order to minimize the empty spaces around the openings 13, the profile of the cutting blade 9 edge 14 is convex and is adapted to the contour of said openings 13, while the internal contour of the closed end 12a of the flat cavity 12, defined by two halves 10, 11 is adapted to the profile of said cutting blade 9 edge 14.

The two halves 10, 11, matched with tongues and grooves, constituting said liner have a low coefficient of friction and are made of high abrasion resistance material such as, for example, polyethylene polymer.

The trimming device has available means which comprise said enclosure allowing the eventual opening thereof. Said means comprise two half-ducts 15, 16, directly facing each other, provided with respective flanges 17, 18 at their mouthpieces facing each other, which are hinged to each other at a point 19 of their periphery and provided with fastening means 20 at a directly opposed point. Said flanges 17, 18 back up the two halves 10, 11, packing their tongues and grooves. By freeing the fastening means 20, the two half-ducts can rotate on the hinge 19 leaving free access to the interior of the enclosure for cleaning and maintenance of cutting blade 9, the flat cavity 12 two halves 10, 11, openings 13 and half-ducts 15, 16.

Faces of the flanges 17, 18 facing each other include protrusions 21 which are matched with related offsets 22 of the two halves 10, 11 so that two half-ducts 15, 16 directly facing the liner openings 13 are secured. In addition, in order to prevent liquid leakage from the meat products between the faces of the flanges 17, 18 contacting, respectively, the faces of the halves 10, 11, elastic means 30 are included.

The trimming device 8 includes a supporting member 23, linked to the stuffing machine 1 by means of an hinge 24, provided with a fork-shaped portion 23a to which flange 17 is joined as well as a bent appendage 25 to which is fastened driving mean s of the cutting blade 9. The support 23 is arranged so that the half ducts 15, 16 remain directly facing the outlet 2 of the stuffing machine 1 and the duct of the stuffing are 3, respectively.

In order to make the device cleaning and maintenance easier, the whole cutting assembly 8 may rotate with respect to the hinge 24 giving access to said outlet 2, fastening means being available between the half ducts 15 and the outlet 2 and between the half duct 16 and the duct of the stuffing area 3. Elastic means 28 being included at respective areas of contact.

The cutting blade 9 is driven by means which comprise a fluid dynamic cylinder 26 attached to the bent portion 25 of the supporting member 23. The cylinder 26 rod 27 is joined to an end of said cutting blade 9, opposite to the edge 14, by suitable fastening means 29, such as, for example, a block integral with the rod 27 having a notch adapted to receive the end of the cutting blade 9 and a screw fixed on said block which crosses the blade 9 through a hole.

What is claimed is:

1. Device for stuffing meat product sealed by stapling, said device comprising:
    a stuffing area where a continuous flow of previously conditioned meat product supplied by a stuffing machine through an outlet is introduced into an endless sleeve with a first end of the sleeve being closed by a staple,
    a stapling machine located after the stuffing area for stapling at regular intervals by first and second slightly spaced staples and which cuts the sleeve at a portion of the sleeve between said first and said second staples to produce individual elements of stuffed meat product sealed by stapling, a trimming device located between said outlet of the stuffing machine and said stuffing area, said trimming device producing a cross cut separation at regular intervals in said continuous flow of meat product before introduction of the meat product in said endless sleeve, said trimming device comprising an enclosure interposed in the meat continuous flow and providing openings for passage of the meat product and a guide for a cross cutting blade having a cutting edge, said enclosure comprising two halves coupled to each other by matched grooves and tongues leaving a flat cavity between them for housing and guiding said cutting blade, two half ducts respectively connected to the outlet of the stuffing area, provided with respective flanges at a mouthpiece of the two half ducts and facing each other, said flanges backing the two halves of the enclosure so that the grooves and tongues are matched, and a supporting member linked to the stuffing machine by a hinge provided with a fork-shaped portion to which is joined one of the flanges, and a bent appendage to which a driving device for the cutting blade is attached so that the half ducts remain directly facing the outlet of the stuffing machine, the trimming assembly being able to rotate with respect to the hinge to provide access to said outlet.

2. Device, according to claim 1, wherein said flanges are hinged to each other at a point of their periphery and provided with fastening means at a directly opposite point.

3. Device, according to claim 1, wherein a profile of the cutting edge of the cutting blade is convex and conforms to a contour of said openings while an internal contour of the closed end of the flat cavity defined by the two halves conforms to the profile of said edge of said cutting blade so that empty spaces around the openings are minimized.

4. Device, according to claim 1, further comprising programmable control means for making said separation, at regular intervals, of the continuous flow of meat product.

5. Device, according to claim 1, wherein the faces of said flanges facing each other include protrusions matched with related offsets of the two halves so that there is direct facing of the two half ducts with the openings of the enclosure.

6. Device according to claim 5, wherein between the faces of the flanges in contact with the faces of the halves is an elastic material.

7. Device, according to claim 1 wherein between the half ducts and the outlet and the duct of the stuffing area is an elastic material.

8. Device, according to claim 1, wherein said driving device of the cutting blade comprises a fluid dynamic cylinder a rod of which is joined to an end of said cutting blade, opposite to the edge.

9. Device, according to claim 1, wherein a coupling of said halves closes one of the ends of said flat cavity close to said openings while the coupling leaves the other end open.

* * * * *